A United States Patent Office

3,523,923
Patented Aug. 11, 1970

3,523,923
HIGH VISCOSITY ELASTOMERIC POLYESTERS CONTAINING ETHER GLYCOL RESIDUES AND PREPARED IN THE PRESENCE OF CHLORINATED ORGANIC COMPOUNDS
James G. Smith and Bobby J. Sublett, Waterloo, Ontario, Canada, assignors to Eastman Kodak Company, Rochester, N.Y., a corporation of New Jersey
No Drawing. Continuation-in-part of application Ser. No. 637,851, May 11, 1967, which is a continuation of application Ser. No. 237,383, Nov. 13, 1962. This application May 20, 1968, Ser. No. 730,636
Int. Cl. C08g *17/14, 51/30*
U.S. Cl. 260—75                                     10 Claims

ABSTRACT OF THE DISCLOSURE

Elastomeric polyesters of (1) a dibasic carboxylic acid or its lower alkyl ester, (2) 1,4-cyclohexanedimethanol, and (3) a poly(tetramethylene glycol), have improved inherent viscosities of at least 1.3 when a high boiling compound boiling above 250° C. at atmospheric pressure (for example, a chlorinated triphenyl compound) is employed during condensation of the above reactants.

---

This application is a continuation-in-part of Smith and Sublett U.S. Ser. No. 637,851, filed May 11, 1967, now abandoned, which in turn is a continuation of Smith and Sublett U.S. Ser. No. 237,383, now abandoned.

This invention relates to an improved process of producing elastomeric polyesters and more particularly to a process for the production of such polyesters in which an improved inherent viscosity of the polyester material is attained during the polyester synthesis. The invention has particular reference to a process for the production of elastomeric polyesters of such inherent viscosity characteristics as to render them especially useful for the manufacture of highly elastic filaments, fibers, yarns, film, and other shaped objects.

It is known from Kibler, Bell, and Smith U.S. Pat. 2,901,466 (issued Aug. 25, 1959, and entitled "Linear Polyester and Polyester Amides From 1,4-Cyclohexanedimethanol") that highly polymeric, linear polyesters and polyester-amides may be produced by condensing either or both cis- or trans-1,4-cyclohexanedimethanol alone, or with one or more bifunctional reactants, with one or more bifunctional carboxy compounds (such as dicarboxylic acids) and that such compounds have sufficiently high melting points, inherent viscosity, and other characteristics as to make them useful in the production of filaments, fibers, yarns, films, and other shaped objects. In the copending Kibler, Bell, and Smith U.S. Ser. No. 145,433 (filed Oct. 16, 1961, and entitled "Preparation of Elastomeric Polymers," now abandoned) a process is described whereby elastomeric polyesters can be obtained from the various polyester compositions disclosed in U.S. Pat. 2,901,466, particularly those prepared from terephthalic acid or its esters, 1,4-cyclohexanedimethanol and poly(tetramethylene glycol) and that these polyesters can be used in the production of various elastic products such as filaments, fibers, yarns, and other products which can be employed as a substitute for, or an improvement over, similar products produced from rubber or other elastic materials.

It has been clearly demonstrated that filaments and elastic yarns produced from rubber suffer from several disadvantages. For example, they are unavailable in fine deniers; they are unstable to heat, oxygen, and ozone; they cannot be dyed satisfactorily; and they have certain other deficiencies well known to those skilled in the art to which this invention relates.

It is also known that elastomeric polyesters of the type here under consideration, particularly in the form of fibers, filaments, yarns and the like, have certain deficiencies with respect to their ability to return to their original lengths after being subjected to stretching and, in fact, display a tendency to develop a permanent set after being stretched for a considerable period of time. This condition of permanent set is measured quantitatively by holding a sample of fiber or film at 150 percent elongation for a period of 16 hours and then measuring the increase in length of the sample after it has been released and allowed to contract. The increase in length is expressed as a percentage of the original length of the sample and this value is termed the percentage of permanent set. The matter of permanent set in elastomers has been the subject of extensive research and one means for overcoming this deficiency is described and claimed in the copending Bell, Kibler, and Smith U.S. Ser. No. 215,768, filed Aug. 9, 1962, entitled "Elastomeric Polyesters of Diacids, Cyclohexanedimethanol and Poly(Tetramethylene Glycol," and now U.S. Pat. 3,261,812.

The instant invention has to do with a process of producing elastomeric polyesters and, in one aspect, is more specifically directed to a simple and effective means of controlling the inherent viscosity (I.V.) of the ultimate polyester material by the employment in the reaction in which the polyester material is synthesized, of an inert high boiling medium, as will be more fully set forth hereinafter. Thus, the present invention is an improvement in the production of the type of polyesters disclosed in the above-mentioned U.S. Pat. 2,901,466. In another aspect, the invention has to do with the production of elastomeric polyesters in which the polyester material includes as a permanent ingredient an agent which substantially reduces the tendency of fibers, filaments, yarns, and other products produced therefrom to develop permanent set when subjected to stretching for long periods of time. The present invention is thus also an improvement in the process of producing elastomeric polyesters disclosed in the above-mentioned Bell, Kibler, and Smith U.S. Ser. No. 145,433 (filed Oct. 16, 1961, and now abandoned) in which the tendency toward permanent set of elastomeric polymers is reduced by means of a special component which constitutes all or a part of the soft segment of the elastomeric polymer.

More specifically, the elastomeric polyesters with which the present invention is particularly concerned are prepared by reacting in the presence of an alcoholysis catalyst at least one compound selected from the class consisting of the dibasic carboxylic acids and their esters with at least one member of the group consisting of the cis- and trans-isomers of 1,4-cyclohexanedimethanol, and with the ether glycol having the structural formula

wherein $n$ is an integer from 14 to 90. This ether glycol is commonly known as poly(tetramethylene glycol).

In preparing elastomeric compositions of this type, the reaction is carried out in such manner that the above-defined dihydroxy moiety, cyclohexanedimethanol+poly(tetramethylene glycol), contains at least 50 mole percent of said cyclohexanedimethanol constituent. The poly(tetramethylene glycol) constituent consequently will constitute no more than 50 mole percent of the dihydroxy moiety. The poly(tetramethylene glycol) component should be present in an amount corresponding to 50 to 90 weight percent of the final polyester. When said percentage range is 75 to 90 percent, the cyclohexanedimethanol should preferably be present as substantially entirely the trans-isomer, i.e., less than 10 percent of the cis-isomer should be present. However, useful compositions are obtained when more than this amount of cis-isomer is present in the elastomeric polyester. Polyesters so prepared will have a crystalline melting point greater than 150° C. and should have an inherent viscosity of at least about 1.3 up to 4.0 or higher and preferably within the range of 1.4 to 3.2.

The dicarboxylic acids which are useful for the preparation of the elastomeric polyesters of the invention are those in which the carboxylic acid groups are attached to a hexacarbocyclic nucleus in a para relationship and the entire hydrocarbon moiety contains 6 to 20 carbon atoms. Examples of hexacarbocyclic dicarboxylic acids wherein the carboxy radicals are attached to a hexacarbocyclic nucleus in a para relationship include terephthalic acid; trans-1,4 - cyclohexanedicarboxylic acid; 4,4'-sulfonyldibenzoic acid; 4,4'-diphenic acid; 4,4'-benzophenonedicarboxylic acid; 1,2-di(p-carboxyphenyl)ethane; 4,4'-methylenedibenzoic acid; 1,2-di(p-carboxyphenoxy)ethane; 4,4'-dicarboxydiphenyl ether; and 1,4- or 1,5- or 2,6- or 2,7-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named come within the scope of this preferred group.

Referring again to the matter of inherent viscosity (I.V.), it is important that elastomeric polymers have as high a viscosity as possible. For example, in the copending Bell, Kibler, and Smith U.S. Ser. No. 151,557 (filed Nov. 10, 1961, entitled "Preparation of Elastomeric Polymers," and now U.S. Pat. 3,157,619), it has been shown that the viscosity of the polymer has a marked effect on the properties of products produced from these polymers such as fibers, filaments, yarns, and the like. For example, fibers formed from compositions such as those referred to above should possess high elongations, preferably about 400 percent. Such elongations may be obtained with high inherent viscosity elastomers (I.V. greater than 1.3) but are not obtained with low inherent viscosity polymers (I.V. less than 1.2). Similar beneficial effects of high polymer viscosity on physical properties are obtained with films and moldings. The following table illustrates the marked influence of polymer viscosity on fibers produced from a typical elastomeric polyester produced as described in the above-mentioned U.S. Pat. 3,157,619, i.e., a polymer from dimethyl terephthalate and cyclohexanedimethanol (67 percent trans) containing 67 percent by weight of poly(tetramethylene glycol) of molecular weight 2,700.

INFLUENCE OF POLYMER VISCOSITY ON FIBER PROPERTIES OF ELASTOMERS

| Polymer inherent viscosity | Yarn inherent viscosity | Tenacity g./d. | Elongation percent | Elastic modulus At 30% extension | At 100% extension |
|---|---|---|---|---|---|
| 1.15 | 1.06 | 0.24 | 370 | .16 | .10 |
| 1.38 | 1.28 | 0.52 | 400 | .14 | .18 |
| 1.49 | 1.40 | 0.60 | 650 | .08 | .08 |
| 1.60 | 1.48 | 0.55 | 700 | .086 | .071 |

It can be seen from this table that as the yarn viscosity increases, the elongation and tenacity of the yarn increases.

It will, of course, be understood that the increase in viscosity occurs during the polymerization stage in which the polyester is formed.

In the above-mentioned application Ser. No. 151,557, filed Nov. 10, 1961, now U.S. Pat. 3,157,619, certain aromatic amines are employed during the preparation of elastomeric polyesters in order to obtain a desired inherent viscosity. The instant application deals with certain agents to be described hereinafter which are employed during the preparation of elastomeric polyesters in order to control the inherent viscosity and also to reduce the tendency of products prepared from the elastomeric polyesters to develop permanent set when subjected to stretching for extended periods of time.

DEFINITIONS

For purposes of clarity and of properly disclosing and defining our invention as hereinafter described, the following definitions are given:

*Inherent viscosity (I.V.)*.—This property, represented by $[\eta]$, which is used as a measure of the degree of polymerization of a polymeric compound, is calculated from the equation:

$$[\eta] = \frac{Ln_{\eta_r}}{C}$$

wherein $\eta_r$ is the ratio of the viscosity at 25° C. of a dilute (approximately .25 percent by weight) solution of the polymer in a solvent composed of 60 percent by weight of phenol and 40 percent by weight of tetrachloroethane to the viscosity of the solvent itself, and C is the concentration of the polymer in grams per 100 cubic centimeters of the solution. In this application, the value of C is 0.25 gram.

*Tenacity or tensile strength*.—This is a measure of the strength of the fiber, filament, or yarn under study. It is expressed in grams per denier (g./d.) and is calculated by dividing the initial denier of the fiber under study into the tension (in grams) required to break the yarn. The values of tenacity reported in this invention were in each instance determined on a two-inch specimen in an Instron tester manufactured in Instron Engineering Corporation, 2500 Washington St., Canton, Mass. at a rate of extension of the specimen of 1,000 percent per minute.

*Elongation*.—This is a measure of the extent to which a fiber, filament, or yarn is stretched when it breaks. It is expressed as a percentage and is calculated by dividing the original length of the sample into the increase in length and multiplying by 100. Specifically, two marks 20 cm. apart are placed on the fiber or film sample and the sample is extended by hand until it breaks. The distance which separates the marks at the time of breakage is noted and the elongation calculated. The average of five or six such determinations is used as the value of the elongation of the sample in question. Approximately eight seconds are required to pull the fiber sample to the breaking point and this represents a rate of elongation of approximately 3,000 percent per minute.

*Elastic recovery*.—This property is a measure of the ability of a fiber, yarn, filament, or film to return to its original length after stretching. For the purposes of this invention, the elastic recovery of a sample is determined by drawing the sample to an elongation of 400 percent and then allowing it to return to a relaxed state (but not "snap" back). The amount of elongation which is recovered divided by the original elongation and the result multiplied by 100 gives the percent elastic recovery.

*Modulus of elasticity*.—As used herein, modulus of elasticity may be defined as the tension in grams per initial denier per percentage elongation necessary to stretch the sample to the stated percentage elongation. When measuring the modulus of films, the tension may be expressed in pounds per square inch.

*Permanent set.*—One of the most important properties that an elastomer should possess is the ability to return rapidly to its original dimensions after deformation. If the sample does not return to its original dimensions, the distortion induced in the sample is termed permanent set and the amount of permanent set is expressed as a percentage of the sample's original dimensions. The amount of permanent set varies with the manner in which the deformation is effected and generally becomes greater when the stress is applied for a long period of time than when stress is applied for a short period of time.

For this reason, the following test was used to measure the permanent set of elastomeric fibers. Both ends of a 40 cm. length of fiber are clamped so that a loop of fiber is formed which measures 20 cm. in length. This double strand is drawn smoothly and rapidly to a length of 80 cm. (300 percent elongation) and then relaxed to a length of 50 cm. (150 percent elongation). This length is maintained for 16 hours after which the fiber is released and permitted to retract. The length of the fiber is measured one minute and 60 minutes after release, and the length in excess of the original sample length is expressed as a percentage of the original length. Normally this test is conducted in a room where the temperature is controlled at 21° C. and humidity at 65 percent.

*Crystalline melting point.*—This is defined as the temperature at which a sample of the polymer under test will flow under slight pressure on a Fisher-Johns melting point apparatus manufactured and sold by Fisher Scientific company, 633 Greenwich St., New York 14,, N.Y.

The instant invention has as an object to provide an improved process for the production of elastomeric polyesters useful in the production of highly elastic polyester filaments, fibers, yarns, films, and other shaped objects.

Another object is to provide a simple and effective means of controlling the inherent viscosity of an elastomeric polyester material.

A further and specific object is to provide a means of controlling the inherent viscosity of various polyester compositions exemplified by those prepared from terephthalic acid or its esters; 1,4-cyclohexanedimethanol; and poly(tetramethylene glycol).

A still further object is to provide an improved elastomeric polyester composition suitable for the production of fibers, filaments, yarns, films, and other shaped objects, which compositions and products will have a reduced tendency toward permanent set.

A further object is to provide an elastomeric, linear polyester fiber-forming composition and fibers, filaments, yarns, films, and the like produced therefrom which includes as a permanent component an agent which substantially reduces the tendency toward permanent set of the material upon being subjected to stretching for extended periods of time.

It is a specific object of the invention to provide an elastomeric, linear polyester fiber-forming composition and fibers, filaments, yarns, films, and the like produced therefrom, prepared from terephthalic acid or its esters; 1,4 - cyclohexanedimethanol; and poly(tetramethylene glycol), said composition containing as a permanent ingredient an agent which substantially reduced the tendency toward permanent set of the material upon being subjected to stretching for extended periods of time.

Other objects will appear hereinafter.

These objects are accomplished by the following invention which, according to one embodiment, comprises adding to the reactants employed in the preparation of an elastomeric polymer, for example, a polymer prepared from dimethyl terephthalate; 1,4-cyclohexanedimethanol; and poly(tetramethylene glycol); an inert high boiling component, such as an aromatic or alkyl substituted aromatic hydrocarbon boiling at temperatures greater than 250° C. at atmospheric pressure or a chlorinated aromatic hydrocarbon or an aromatic ether of similar boiling range, and then carrying out the alcoholysis stage of the polyesterification reaction in known manner as exemplified by the process described in U.S. Pat. 2,901,466. In carrying out the reaction, the reactants are charged into a reaction vessel along with the high boiling component. The first or transesterification stage of the reaction is carried out at 180° to 300° C., more conveniently at 180° to 220° C., and the temperature is then raised to the polymerization temperature, which, for example, may be within the range of 260° to 300° C. and preferably within the range of 270° to 285° C. A vacuum is then applied and the polymer increases rapidly in molecular weight. During this final stage of polymerization, the high boiling solvent slowly distills from the molten polymer and when polymerization is completed, there usually remains in the polymer a residue of the original high boiling material. It has been found, in accordance with the invention, that a polymer thus obtained has from 10 percent to 50 percent higher viscosity than that of similar polymers produced in the same manner but with the high boiling solvent omitted.

The high boiling agents which have been found to be effective in the operation of our invention are selected from the group of compounds illustrated by the structural formula (A)
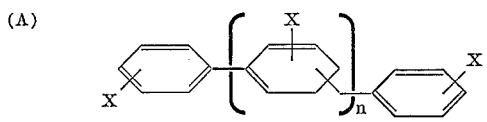

wherein $n$ may have the values of 0, 1, 2, or 3, and X indicates that the aromatic rings may be monosubstituted or polysubstituted by functional groups selected from the group consisting of chlorine, bromine, iodine, and alkyl groups containing one, two, or three carbon atoms.

Other high boiling agents which have been found to be effective may be represented by the formula (B)
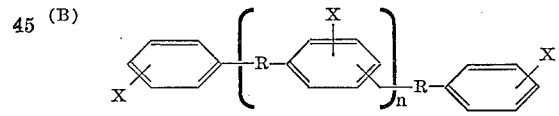

wherein $n$ may have the values of 0, 1, 2, or 3, and R is selected from the group consisting of —O—, —$CH_2$—, and —$CH_2$—O—$CH_2$—, and X indicates that the aromatic rings may be monosubstituted or polysubstituted by functional groups selected from the group consisting of chlorine, bromine, iodine, and methyl. It is apparent that mixtures of two or more of these compounds may be used as efficaciously as a single compound.

The amount of high boiling material employed in accordance with the invention may range from 1 percent to 200 percent by weight of the final polymer, although the preferred amount generally lies within the range of 10 percent to 100 percent. The exact amount must be determined empirically for each combination of high boiling compound and the particular polyester being formed.

One very useful group of compounds is manufactured and sold by Monsanto Chemical Company under the trade designation "Aroclors." This class of materials consists of chlorinated biphenyls or polyphenyls and, as such, each Aroclor is a complex mixture which differs from other Aroclors in the amount of chlorine present in the mixture. Each Aroclor is identified by a characteristic number which indicates the amount of chlorine present.

A similar group of materials is also sold by Monsanto Chemical Company under the trade name of "Therminols."

The Aroclors generally can be represented by the Formula A wherein $n$ is 0 to 1 and X is Cl. One member of this group is Aroclor 5442 which can be represented by Formula A wherein $n$ is 1, X is Cl, and the chlorine content of the material is 42 percent by weight, and which is particularly efficient in its ability of promoting a substantial increase in viscosity of the final polymer through the use of a relatively small quantity of the high boiling material.

Another group of high boiling compounds useful in the practice of the present invention are the polyphenyls themselves or their alkylated derivatives. An example of this group is p-terphenyl.

A third group of compounds which are particularly effective for the purposes of our invention are the polyphenyl ethers. These are represented by Formula B wherein $n$ is 0, 1, 2, or 3, no substitution exists on the aromatic rings, and R is —O—. A particular member of this group which is especially effective in promoting an increase in viscosity of the final polymer is bis(phenoxyphenyl) ether (Formula B wherein $n$ is 2 and R is —O—).

In the following examples and description there are set forth several of the preferred embodiments of the invention but they are included merely for purposes of illustration and not as a limitation thereof.

The following thirteen examples illustrate that phase of our invention wherein elastomeric polyester compositions of the desired high viscosity may be obtained in accordance with our process as above described.

Example 1

A reaction vessel, equipped with stirrer and nitrogen inlet, was charged with 9.5 grams (0.04875 mole) of dimethyl terephthalate, 0.4 ml. (0.00125 mole) of dibutyl sebacate, 16 grams (0.08 mole) of 1,4 - cyclohexanedimethanol (70 percent solution in methanol), 22.5 grams (0.0075 mole) of poly(tetramethylene glycol) (molecular weight 3,000), 0.2 gram of p,p'-dioctyldiphenylamine, 50 grams of Aroclor 1254 (a chlorinated biphenyl containing 54 percent by weight of chlorine) and 0.3 ml. of a 70 percent solution of $Mg[HTi(OR)_6]_2$ in n-butanol (R=isopropyl). The reaction vessel was heated for one hour at 200° C. while stirring and sweeping with nitrogen. The temperature was then raised rapidly to 278° C. and the pressure reduced to 0.3 to 0.1 mm. The polymer was stirred under vacuum at 278° C. for one hour and after cooling to room temperature the polymer was removed and found to have an inherent viscosity in 60:40 phenol/tetrachloroethane of 1.67.

Example 2

The procedure of Example 1 was repeated exactly, except that the Aroclor 1254 was omitted from the reagents charged into the reaction vessel. The final polymer had an inherent viscosity of only 1.30, thus indicating by comparison the marked advantage of employing the high boiling component in accordance with the invention.

Example 3

The procedure of Example 1 was repeated except that 45 grams (.015 mole) of polytetramethylene glycol (molecular weight 3,000) was used instead of 22.5 grams. The final polymer had a viscosity of 1.87. When this experiment was repeated using no Aroclor 1254 as in Example 2 above, the final polymer had a viscosity of only 1.40.

Example 4

The procedure of Example 1 was repeated using 12 grams of polytetramethylene glycol (.004 mole, molecular weight 3,000) instead of 22.5 grams. The final polymer had a viscosity of 1.45. On repeating this experiment without using the Aroclor 1254 as in Example 2 above, the final polymer had a viscosity of only 1.09.

The following nine examples in tabulated form clearly illustrate the advantages derived from the use of other high boiling solvents in accordance with our invention. The procedure employed in each of these examples was identical with that described in Example 1.

TABLE 1

| Example | High boiling agent | Amount (g.) | Inherent viscosity of final polymer |
|---|---|---|---|
| 5 | Aroclor 1260 | 50 | 1.98 |
| 6 | Aroclor 5442 | 30 | 2.52 |
| 7 | do | 10 | 2.22 |
| 8 | do | 5 | 1.79 |
| 9 | Bis(phenoxyphenyl) ether | 10 | 1.61 |
| 10 | Terphenyl | 10 | 1.42 |
| 11 | Diphenyl ether | 50 | 1.40 |
| 12 | Benzyl ether | 20 | 1.50 |
| 13 | 3-methyldiphenylmethane | 15 | 1.63 |

As has been indicated above in the general description of our invention, another phase thereof is the reduction of the tendency toward permanent set as above defined in elastomeric polyesters of the type here under consideration. By employing the high boiling agents of the type defined by the structural formulae given above and as illustrated in the immediately preceding examples, it was found that the final elastomeric polyester contained a certain residual amount of the high boiling agent and that this definitely contributed to a reduction of the tendency of the composition and products produced therefrom, such as fibers, filaments, yarns, film, and the like to undergo a permanent set when subjected to tension for substantial periods of time. This discovery lead to the second phase of the invention, namely, the provision of a definite amount of a residual high boiling component in the final elastomeric polyester material in order to accomplish this desirable result. The following examples and description will illustrate this phase of our invention.

It is desirable that elastomeric yarns have a permanent set of less than 40 percent at one minute and less than 30 percent at 60 minutes (see section herein entitled "Definitions" for a definition of "permanent set"). To the best of our knowledge and belief most of the polyester compositions which have been produced heretofore have values greater than these and, as such, they are not suitable for use in any known applications. For example, garments such as foundation garments or bathing suits, are worn for long periods of time with the fibers elongated 25 to 200 percent. If the fibers have poor permanent set properties, the garment on being removed will not return to its original dimensions. It is thus easily seen that good permanent set properties are necessary for wide usage.

As indicated above, it has now been found that the permanent set properties of elastomeric polyester can be markedly improved by incorporating into the polyester material, either during its synthesis or after completion of the polymerization, certain high boiling compounds of low volatility, high solubility in the polyester and unreactivity toward the polyester. The effectiveness of these compounds varies somewhat with the composition of the base polymer. In some cases, a small concentration of the additive is found to be effective, while in other cases a large amount of additive is necessary. Generally, the compositions of base polymer plus additive which have satisfactory permanent set are found to contain 5 to 30 percent by weight of the additive. The preferred concentration of additive is 12 to 25 percent by weight of the polyester material.

As illustrated by Examples 1–13, the high boiling agent or additive can be incorporated in the polymer during the polymer synthesis. Another method of incorporating the additive is by mixing the base polyester and the additive by any well known mixing method such as by milling on heated rolls, mixing in a Banbury mill or equivalent device. Another method is to inject the additive into the molten polymer as it is extruded from the reactor following synthesis. In still another method, the additive can be dissolved in a solvent such as benzene or toluene and the solution stirred into the ground polymer. In such a case, the solvent serves to swell the polymer and permit the additive to penetrate the polymer particles. These various methods of incorporating the high boiling agent into the polymer material will be illustrated in the following examples. In these examples, and as indicated above, the Aroclors are chlorinated biphenyls, triphenyls, or mixtures of the two which are available from Monsanto Chemical Company. Several types are sold, each type identified by a four digit number: the last two digits indicate the approximate weight percentage of chlorine in the product, the first two digits indicate the type of material, as follows:

12—chlorinated biphenyls
25—blends of chlorinated biphenyls
44 and triphenyls
54—chlorinated triphenyls The Aroclors 1242 and 5442 have been found to be especially effective in reducing the permanent set of polyester elastomers. The former compound is represented by Formula A wherein $n$ is 0, X is chlorine, and the chlorine content of the material is 42 percent by weight. Aroclor 5442 has already been described.

Another group of compounds which are effective in reducing the permanent set of elastomers is the polyphenyl ethers. A particularly effective member of this group is 3,3'-diphenoxydiphenyl ether which is represented by Formula B wherein $n$ is 2, no substitution exists on the aromatic rings, and R is —O—.

It should be emphasized at this point that this invention is equally applicable to elastomeric polyester compositions which have recovery from a 400 percent elongation in the range of 90 to 100 percent. In all these instances, a reduction in the degree of permanent set of fibers is noted when the high boiling agent or agents described in this invention is present.

Example 14

Preparation of an elastomer in the presence of an Aroclor. A 250 ml. flask equipped with stirrer, nitrogen inlet and distillation head was charged with 9.6 grams (.0344 mole) of dibutyl terephthalate, 8.4 grams (0.0583 mole) of trans-1,4-cyclohexanedimethanol, 32.1 grams (0.0107 mole) of poly(tetramethylene glycol) with a number average molecular weight of 3,000, 12 grams of Aroclor 5442, a mixture of chlorinated triphenyls having an average chlorine content of 42 percent by weight, 0.4 gram of dilauryl thiodipropionate and 0.6 ml. of a 21 percent solution of $Mg[HTi(OC_4H_9)_6]_2$ in n-butanol.

The mixture was stirred and heated under nitrogen to a temperature of 200° C. During the first or alcoholysis stage of the reaction, butanol is evolved and collected. After sixty minutes, the reaction temperature was increased over a forty minute period to 280° C. A vacuum was then rapidly applied and within five minutes the presence was reduced to less than 0.15 mm. of mercury. The residual polymer was stirred at this temperature and pressure for sixty minutes during which time the viscosity of the melt increased rapidly until the polymer was wrapping about the stirrer in a ball. The product from this second, or melt phase, stage of the polymer preparation was cooled, removed from the flask, and found to have an inherent viscosity of 2.14 and a crystalline melting point of 220° to 225° C. The final polymer contained 80 weight percent of poly(tetramethylene glycol), and a chlorine analysis indicated that 20 percent by weight of the polymer consisted of Aroclor 5442.

This material was melt spun into fibers, and the fiber properties were as follows:

Tenacity, g./d. _____ 0.32
Elongation, percent _____ 707
Secant modulus at 100% elongation, g./d. _____ .024
Recovery from 400% elongation, percent _____ 95.2
Permanent set, percent:
   1 minute _____ 40
   60 minutes _____ 26

Example 15

In order to determine effect of absence of the chlorinated triphenyl additive on the permanent set and other fiber properties, a sample of the elastomeric polymer prepared in Example 14 was extracted with cyclohexane, a solvent which removed the Aroclor 5442 but leaves the polyester essentially untouched. A chlorine analysis showed that the polymer contained 0.5 percent by weight of Aroclor 5442. The extracted polyester was now melt spun into fibers and the following fiber properties were obtained.

Tenacity, g./d. _____ 0.47
Elongation, percent _____ 671
Secant modulus at—
   30%, g./d. _____ 0.048
   100%, g./d. _____ 0.032
Recovery from 400% elongation, percent _____ 95.0
Permanent set, percent:
   1 minute _____ 91
   60 minutes _____ 63

It can readily be seen that the permanent set properties of the elastomeric yarns have been adversely affected by the removal of the Aroclor 5442. The remaining fiber properties were essentially unchanged.

Example 16

The polymer of this invention can be prepared by a continuous melt phase process utilizing an apparatus such as that shown in FIG. 1 of the drawing of our copending application Ser. No. 166,155, filed Jan. 15, 1962, now U.S. Pat. 3,238,178, issued Mar. 1, 1966, which is a simplified illusration in the nature of a flow sheet showing schematically one form of apparatus in which the polymers of our invention can be prepared. The reagents are mixed batchwise, each batch consisting of 2025 grams (10.44 moles) of dimethyl terephthalate, 9,600 grams (3.20 moles) of poly(tetramethylene glycol) of number average molecular weight 3,000, 3,460 grams (24.0 moles) of trans-1,4-cyclohexanedimethanol, 114 grams of a 21 percent solution of $Mg[HTi(OC_4H_9)_6]_2$ in n-butanol and 360 grams (three percent by weight of the final polymer) of dilauryl thiodipropionate. This mixture is melted by heating to 140° C., stirring and feeding at a rate of 17 pounds per hour into the propolymerizer through the inlet 1. The prepolymerizer column was heated to 220° C. (operating range of the column is 180° to 280° C.) by the hot oil system 3 and the pressure in the column generated by the evolved methanol was regulated by the pressure regulator 2 at 10 p.s.i. (operating range of pressure is 0 to 150 p.s.i.). The term p.s.i. is herein used to indicate pounds per square inch gauge. The molten reagents covered the plates and flowed down the column by passing through the overflow pipes 5 onto the plate beneath. At the bottom of the prepolymerizer, the reaction product is delivered by pump 6 through heated tube 7 to the polymerizer in which the final polymer is formed. This reactor was heated to 278° C. by a second hot oil system 4 operating range 260° to 310° C. and maintained under vacuum by two independent vacuum systems operating through the mainfolds 8 and 13. The reactor was divided into two sections separated by a liquid seal 11 in which molten polymer served as the liquid. The upper section 10 above the liquid seal was maintained at a pressure of 1 to 2 mm. of mercury (operating range 0.5 to 50 mm. of mercury) and the lower section was maintained at a pressure of 0.2 mm. of mercury (maximum operating pressure 1 mm. of mercury). The low molecular weight material delivered to the polymerizer was distributed over the vertical tube bundle 9 so as to expose the maximum surface to the vacuum, and then the material passed through the liquid seal 11 into the lower section. In this section, the polymer flowed over a series of slipping heated baffle plates 12 as it decended the column. During the descent, the polymer increased rapidly in viscosity. At the bottom of the column, pump 14 served to remove the polymer from the column and feed it into a quenching bath of water.

The final polymer had an inherent viscosity of 1.88 and contained 80 weight percent of poly(tetramethylene glycol). This polymer was melt spun into fibers which had the following properties.

Tenacity, g./d. _____ 0.31
Elongation, percent _____ 690
Secant modulus at 100% elongation, g./d. _____ 0.026
Recovery from 400% elongation, percent _____ 94
Permanent set, percent:
  1 minute _____ 96
  60 minutes _____ 69

It can be seen that the fiber properties obtained here and in Example 15 are essentially identical, both samples having the same base polymer composition and neither sample containing Aroclor 5442.

The polymer prepared in Example 17 was mixed with various Aroclors and poly(phenyl ethers), the mixtures melt spun and the permanent set data measured on the fibers. In each case, the polymer-additive mixture was prepared by treating the polymer with a benzene solution of the additive. The results are tabulated below.

| Example | Additive | Weight percent of final mixture | Permanent set 1 min. | Permanent set 60 min. |
|---|---|---|---|---|
| 17 | None | | 96 | 69 |
| 18 | Aroclor 5442 [1] | 17 | 41 | 26 |
| 19 | Aroclor 5442 | 23 | 35 | 20 |
| 20 | Aroclor 5442 | 30 | 37 | 22 |
| 21 | Aroclor 1260 [2] | 17 | 56 | 39 |
| 22 | Aroclor 1254 [3] | 17 | 63 | 42 |
| 23 | Aroclor 1254 | 30 | 39 | 27 |
| 24 | Poly(phenyl ether) [5] | 17 | 52 | 31 |
| 25 | Poly(phenyl ether) | 25 | 25 | 18 |
| 26 | Aroclor 1242 [4] | 7 | 40 | 26 |
| | Aroclor 5442 | 14 | | |

[1] A mixture of chlorinated triphenyls having an average chlorine content of 42 percent by weight.
[2] A mixture of chlorinated biphenyls having an average chlorine content of 60 weight percent.
[3] A mixture of chlorinated biphenyls having an average chlorine content of 54 weight percent.
[4] A mixture of chlorinated biphenyls having an average chlorine content of 42 weight percent.
[5] 3,3'-diphenoxydiphenylether.

Example 27

The procedure of Example 17 was repeated but the quantities of reagents were adjusted so that the final polymer contained 77 percent by weight of poly(tetramethylene glycol). The polymer so produced had an inherent viscosity of 1.78 and fibers melt spun from this composition were found to have permanent set of 53 percent at one minute and 36 percent at 60 minutes.

Example 28

The polymer prepared in Example 27 was mixed with Aroclor 5442 by blending together 900 grams of the polymer with 100 grams of Aroclor 5442 in a rubber mill whose rolls were heated to 200° to 225° C. The final mixture was melt spun into fibers and the fibers were found to have a permanent set of 28 percent at one minute and 19 percent at 60 minutes.

The elastomeric polyester filaments, fibers, and yarns of this invention are characterized by a high melting point and a high degree of elongation and recovery from stretch. Fabrics made from these yarns will, therefore, be capable of an extension from two to five times their original length and still return essentially to their original dimensions. Furthermore, the yarns of this invention are readily dyed and show a high resistance to degradation by oxidation, exposure to light, soap, perspiration, or greases and many common chemicals.

It should be emphasized that fibers prepared from the elastomeric polyesters of the instant invention are particularly characterized by retaining the above-mentioned advantageous elastomeric properties of high elongation and recovery from stretch even after an extensive period of elongation. Thus they have the additional and valuable advantage of retaining their advantageous properties under conditions where many elastomeric polyester compositions fail to perform satisfactorily.

Therefore, it is apparent that a yarn or film of this type which has high extensibility and elastic recovery, together with the other advantageous properties described above, will be useful in the fabrication of many articles, such as brassieres, girdles, surgical hosiery, men's braces, bathing suits, stocking tops, suspenders, garters, pajamas, panties, shorts, sweaters, jackets, ski togs, dresses, blouses, shirt collars, shirts, caps, hats, gloves, tapes, ribbons, laces, belting, shoe fabrics, slip covers, upholstery, elastic bandages, hair nets, covers for jars and dishes, ropes and balls, and may other products.

A brief discussion of a few of these uses will serve to emphasize the advantages of the elastomeric yarns of this invention. In the case of foundation garments, the fabrics woven from the subject yarns have a good elongation and a high elastic recovery. Accordingly, fabrics will exert substantial pressure against the body of the wearer. Foundation garments can be constructed which have the desired retaining power and yet are lighter in weight and bulk and more comfortable to wear than those now available. In addition, the fabrics develop a low degree of permanent set after extended periods of elongation. Consequently, garments fabricated from these fabrics return essentially to their original dimensions after being worn for extended periods of time. Such foundation garments do not change dimensions during their lifetime nor do they develop unsightly bulges.

The resistance of the fabrics to grease, ointments and many chemicals makes the elastomeric polymers of the invention particularly useful for elastic bandages and surgical hosiery. Again, the retaining power of the bandages and hosiery can be duplicated with fabrics of lighter weight and bulk than that of the commonly used present day fabrics. This materially increases the comfort of the patient.

Their use in bathing suits, slip covers, and upholstery fabrics depends upon the combination of high elasticity and elastic recovery, ready dyeability, and good resistance to sunlight, soaps, and detergents, etc. Thus bathing suits or slip covers, objects which are usually gaily colored, need be constructed in only a few sizes and yet, because of the high elasticity of and elastic recovery of the fabric, these few sizes can accommodate a wide variety of shapes and sizes with no alterations in the original construction. This results in a considerable simplification in the manufacture of these products.

While the invention has been described in terms of an elastic yarn, it will be understood that the characteristics of the polyester of the invention can find uses other than in yarns. Among such uses, there may be mentioned elastic coatings for paper and the like, fabric coatings, conformable elastic films, heat-shrinkable closures for bottles and the like, safety glass interlayers, flexible tubing, coatings for wire, and many other products.

Although the invention has been described in detail with particular reference to certain embodiments thereof, it will be understood that variations and modifications can be effected within the spirit and scope of the invention as described hereinabove and as defined in the appended claims.

We claim:
1. A process for the preparation of a highly elastic polyester having an inherent viscosity of from about 0.3 to about 4.0, as measured at 25° C. using 0.25 gram of polymer per 100 cubic centimeters of a solvent composed of 60 percent by weight of phenol and 40 percent by weight of tetrachloroethane, said process comprising reacting a mixture of (1) at least one compound selected from the group consisting of dibasic carboxylic acids and their lower alkyl esters, (2) at least one member selected from the group consisting of the cis- and trans-isomers of 1,4-cyclohexanedimethanol, and (3) an ether-glycol having the structural formula

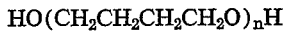
$$HO(CH_2CH_2CH_2CH_2O)_nH$$

wherein $n$ is an integer from 14 to 90, in the presence of an alcoholysis catalyst at a pressure of 0 to 150 pounds per square inch and a temperature in the range of 180° to 300° C. until the alcoholysis stage of the reaction is essentially complete; raising the temperature to the polymerization temperature; and thereafter subjecting the resulting reaction product to a vacuum of less than 50 millimeters of mercury until the inherent viscosity of the polymeric reaction product is between 1.3 and 4.0, said inherent viscosity being measured as described above, said process being characterized by having present in said mixture, during the preparation of the polyester, from 1 to 200 percent by weight of the final polyester, of at least one high boiling compound boiling at a temperature above 250° C. at atmospheric pressure and selected from the group consisting of

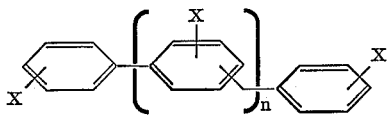

wherein $n$ is 0 and X is chlorine, bis(phenoxyphenyl) ether, and 3-methyldiphenylmethane.

2. The process of claim 1 in which the alcoholysis stage of the reaction is carried out at 0 pounds per square inch and 180° to 220° C., thereafter heating the reaction product to a temperature of 260° to 300° C., and subjecting the reaction product to a vacuum of less than 0.5 millimeter of mercury until the polyester so formed attains an inherent viscosity between 1.3 and 4.0.

3. The process of claim 1 in which the alcoholysis stage of the reaction is carried out at 0 pounds per square inch and 180° to 220° C., thereafter heating the reaction product to a temperature of 270° to 285° C., and subjecting the reaction product to a vacuum of less than 0.5 millimeter of mercury until the polyester so formed attains an inherent viscosity between 1.3 and 4.0.

4. The process of claim 1 in which the high boiling compound has the structural formula

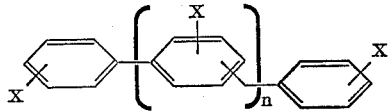

wherein $n$ is 0 and X is chlorine.

5. The process of claim 1 in which the high boiling compound is bis(phenoxyphenyl) ether.

6. The process of claim 1 in which the high boiling compound is 3-methyldiphenylmethane.

7. A highly elastic polymeric polyester of (1) at least one compound selected from the group consisting of dibasic carboxylic acids and their lower alkyl esters, (2) at least one member selected from the group consisting of the cis- and trans-isomers of 1,4-cyclohexanedimethanol, and (3) an etherglycol having the structural formula

$$HO(CH_2CH_2CH_2CH_2O)_nH$$

wherein $n$ is an integer from 14 to 90, said polyester having dissolved therein from about 5 to about 25 percent by weight of the final composition of a high-boiling compound boiling at a temperature above 250° C. at atmospheric pressure and selected from the group consisting of

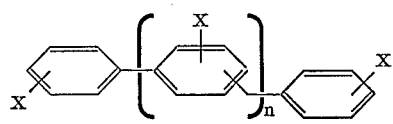

wherein $n$ is 0 and X is chlorine, bis(phenoxyphenyl) ether, and 3-methyl diphenyl methane, said polyester having an inherent viscosity of from about 1.3 to about 4.0, as measured at 25° C. using 0.25 gram of polymer per 100 cubic centimeter of a solvent composed of 60 percent by weight of phenol and 40 percent by weight of tetrachloroethane, a crystalline melting point above 150° C., an essentially complete recovery from a substantial elongation, and a permanent set of no more than 40 percent of one minute and no more than 30 percent at 60 minutes.

8. The polyester of claim 7 wherein the high boiling compound is

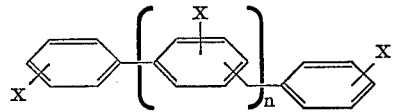

wherein $n$ is 0 and X is chlorine.

9. The polyester of claim 7 wherein the high boiling compound is 3,3-diphenoxydiphenyl ether.

10. The polyester of claim 7 wherein the high boiling compound is 3-methyldiphenylmethane.

References Cited

UNITED STATES PATENTS

| | | | |
|---|---|---|---|
| 2,597,643 | 5/1952 | Izard et al. | 260—75 |
| 2,847,397 | 8/1958 | Kleine et al. | 260—75 |
| 2,901,466 | 8/1959 | Kibler et al. | 260—75 |
| 3,157,619 | 11/1964 | Bell et al. | 260—75 |
| 3,261,812 | 7/1966 | Bell et al. | 260—75 |

WILLIAM H. SHORT, Primary Examiner

L. P. QUAST, Assistant Examiner

U.S. Cl. X.R.
260—33.8, 47